US011006008B2

United States Patent
Mori

(10) Patent No.: US 11,006,008 B2
(45) Date of Patent: May 11, 2021

(54) IMAGE FORMING APPARATUS CONFIGURED TO CONTROL DISPLAY OF ICONS ON A SCREEN, INFORMATION PROCESSING METHOD, AND NON-TRANSITORY COMPUTER-READABLE MEDIUM

(71) Applicant: Takuya Mori, Tokyo (JP)

(72) Inventor: Takuya Mori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/774,306

(22) Filed: Jan. 28, 2020

(65) Prior Publication Data
US 2020/0267270 A1 Aug. 20, 2020

(30) Foreign Application Priority Data

Feb. 15, 2019 (JP) .............................. JP2019-025902

(51) Int. Cl.
*H04N 1/00* (2006.01)
(52) U.S. Cl.
CPC ....... *H04N 1/00413* (2013.01); *H04N 1/0048* (2013.01); *H04N 2201/0094* (2013.01)
(58) Field of Classification Search
None
See application file for complete search history.

(56) References Cited

U.S. PATENT DOCUMENTS

| 2009/0046057 A1 | 2/2009 | Umezawa |
| 2012/0260350 A1* | 10/2012 | Yamada ............. H04N 1/00411 726/28 |
| 2015/0172504 A1 | 6/2015 | Sato |

FOREIGN PATENT DOCUMENTS

| EP | 2410423 A1 | 1/2012 |
| EP | 2584447 A2 | 4/2013 |
| JP | 2009-070365 | 4/2009 |
| JP | 2014-170564 | 9/2014 |
| JP | 2014-241494 | 12/2014 |

OTHER PUBLICATIONS

Extended European Search Report dated Jul. 8, 2020 issued in corresponding European Application No. 20155016.7.

\* cited by examiner

*Primary Examiner* — Andrew H Lam
(74) *Attorney, Agent, or Firm* — Harness, Dickey & Pierce, P.L.C.

(57) ABSTRACT

An image forming apparatus are installed with a plurality of applications each for executing at least one of a plurality of functions of the image forming apparatus. The image forming apparatus includes a memory to store first information associating each of the plurality of applications with at least one of the plurality of functions executed by the application. The image forming apparatus further includes circuitry configured to: set, for each of the plurality of functions, restriction information indicating whether or not to restrict use of the function; and control, in a screen including icons each for starting a corresponding one of the plurality of applications, a display state of each of the icons of the applications based on the restriction information set by the circuitry for the function associated with the application by the first information.

13 Claims, 13 Drawing Sheets

FIG. 5A

| Application Display Setting For Each Function |
|---|
| Application(s) of Copy Function<br>Display |
| Application(s) of Document Box Function<br>Display |
| Application(s) of Scanner Function<br>Display |
| Application(s) of Fax Function<br>Display |
| Application(s) of Printer Function<br>Display |
| Application(s) of Browser Function<br>Display |

FIG. 5B

Application(s) of Copy Function
◉ Display
○ Not Display

Cancel    OK

FIG. 6

| ROW NUMBER | FUNCTION CATEGORY | DISPLAY SETTING | JOB |
|---|---|---|---|
| 1 | COPY | NOT DISPLAY | ABSENT |
| 2 | SCANNER | NOT DISPLAY | ABSENT |
| 3 | FAX | NOT DISPLAY | PRESENT |
| 4 | PRINTER | NOT DISPLAY | ABSENT |
| 5 | BROWSER | NOT DISPLAY | ABSENT |
| ... | ... | ... | ... |

| ROW NUMBER | APPLICATION NAME | FUNCTION CATEGORY |
|---|---|---|
| 1 | LEGACY COPY | COPY |
| 2 | EASY COPY | COPY |
| 3 | ID CARD COPY | COPY |
| 4 | MEETING MATERIAL COPY | COPY |
| 5 | LEGACY SCANNER | SCANNER |
| 6 | EASY SCANNER | SCANNER |
| 7 | ID CARD SCAN | SCANNER |
| 8 | LEGACY FAX | FAX |
| 9 | EASY FAX | FAX |
| 10 | PRINTER | PRINTER |
| 11 | MEDIUM PRINT & SCAN | SCANNER, PRINTER |
| 12 | BROWSER APP | BROWSER |
| ... | ... | ... |

| ROW NUMBER | JOB NAME | FUNCTION CATEGORY |
|---|---|---|
| 1 | FAX RECEPTION | FAX |
| 2 | PRINT/STORE | PRINTER |
| ... | ... | ... |

US 11,006,008 B2

IMAGE FORMING APPARATUS CONFIGURED TO CONTROL DISPLAY OF ICONS ON A SCREEN, INFORMATION PROCESSING METHOD, AND NON-TRANSITORY COMPUTER-READABLE MEDIUM

CROSS-REFERENCE TO RELATED APPLICATION

This patent application is based on and claims priority pursuant to 35 U.S.C. § 119(a) to Japanese Patent Application No. 2019-025902, filed on Feb. 15, 2019, in the Japan Patent Office, the entire disclosure of which is hereby incorporated by reference herein.

BACKGROUND

Technical Field

The present disclosure relates to an image forming apparatus, an information processing method, and a non-transitory computer-readable medium.

Description of the Related Art

Applications enabling the use of functions of multifunction peripherals (MFPs) such as copy, scanner, fax, and print functions are installed on the MFPs. The functions of MFPs have diversified according to the needs, and applications are developed in accordance with the uses of the MFPs. For example, as for applications enabling the use of the copy function, applications, such as an ID card copy application and a meeting material copy application, having settings and operability specialized for respective copy targets are created. These applications are installed in association with the corresponding functions of the MFPs. Icons (hereinafter sometimes referred to as "app icons") of the respective applications are displayed in a home screen displayed on an operation display unit, for example. A user performs a tap operation on a desired app icon to be able to start the corresponding application.

SUMMARY

According to one or more embodiments, an image forming apparatus are installed with a plurality of applications each for executing at least one of a plurality of functions of the image forming apparatus. The image forming apparatus includes a memory to store first information associating each of the plurality of applications with at least one of the plurality of functions executed by the application. The image forming apparatus further includes circuitry configured to: set, for each of the plurality of functions, restriction information indicating whether or not to restrict use of the function; and control, in a screen including icons each for starting a corresponding one of the plurality of applications, a display state of each of the icons of the applications based on the restriction information set by the circuitry for the function associated with the application by the first information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 5A and 5B are diagrams each illustrating an example of a display/non-display setting screen displayed by the MFP according to the embodiment, according to an embodiment of the present disclosure;

FIG. 6 is a diagram illustrating an example of a display setting table, according to an embodiment of the present disclosure;

FIG. 7 is a diagram illustrating an example of an application function category table, according to an embodiment of the present disclosure;

FIG. 8 is a diagram illustrating an example of a job function category table, according to an embodiment of the present disclosure;

Figure 1:
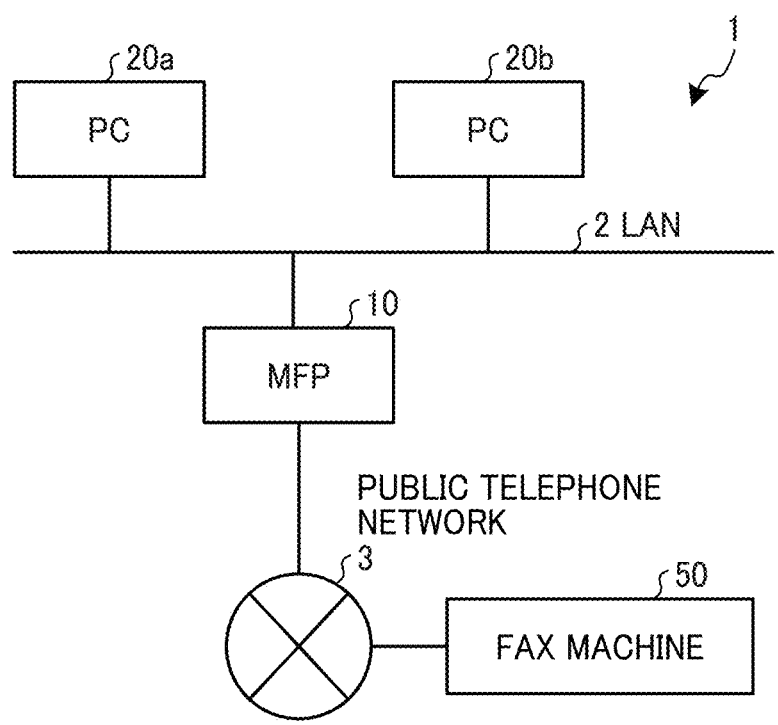
FIG. 1 is a schematic diagram illustrating an example of an overview of a communication system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An image forming apparatus, an information processing method, and a non-transitory computer-readable medium according to an embodiment of the present disclosure will be described in detail below with reference to the accompanying drawings. The present disclosure, however, is not limited to the following embodiment, and the constituent elements of the following embodiment include those that can be easily conceived by those skilled in the art, those being substantially the same ones, and those being within equivalent ranges. Furthermore, various omissions, substitutions, changes, and combinations of the constituent elements can be made without departing from the gist of the following embodiment.

General Arrangement of Communication System

FIG. 1 is a diagram illustrating an example of a general arrangement of a communication system according to an embodiment. The general arrangement of a communication system 1 according to the embodiment will be described with reference to FIG. 1.

As illustrated in FIG. 1, the communication system 1 according to the embodiment includes an MFP 10, a personal computer (PC) 20a, and a PC 20b. The MFP 10, the PC 20a, and the PC 20b are connected to one another via a local area network (LAN) 2 to be able to communicate with one another. Note that the LAN 2 is not limited to a network in a limited area. For example, the LAN 2 may be replaced with a network such as a wide area network (WAN), the Internet, or a dedicated line network. The LAN 2 may include either a wired communication network or a wireless communication network.

The MFP 10 is an example of an image forming apparatus that receives a job for a printer (print data), for example, from the PC 20a or 20b and outputs a corresponding image through printing. Herein, an MFP refers to a multifunction peripheral having at least two functions among a copy function, a printer function, a scanner function, and a fax function. The MFP 10 also receives faxed data from a fax machine 50 or the like via a public telephone network 3 and outputs the received data through printing. The public telephone network 3 is, for example, an analog network or a digital network such as Integrated Services Digital Network (ISDN). Although the communication system 1 illustrated in FIG. 1 includes a single MFP 10 serving as an image forming apparatus, the configuration is not limited to this one. The communication system 1 may include two or more image forming apparatuses.

Each of the PC 20a and the PC 20b is an information processing apparatus that transmits print data as a print job to the MFP 10. The print data is data that is output by the MFP 10 through printing. Note that the information processing apparatus is not limited to the PC and may be, for example, a workstation or a mobile terminal such as a smartphone or a tablet terminal. When a given PC among the PC 20a and the PC 20b is indicated or when the PC 20a and the PC 20b are collectively referred to, the PC 20a or the PC 20b is simply referred to as a "PC 20". Although the communication system 1 illustrated in FIG. 1 includes two PCs (the PC 20a and the PC 20b) serving as the information processing apparatuses, the configuration is not limited to this one. The communication system 1 may include one information processing apparatus or three or more information processing apparatuses.

The fax machine 50 is an apparatus that scans a document to obtain document data and transmits the obtained document data as a fax job to the MFP 10 via the public telephone network 3.

Note that the configuration of the communication system 1 illustrated in FIG. 1 is merely an example. Thus, the apparatuses included in the communication system 1 and the number of apparatuses are not limited to those illustrated in FIG. 1, and the communication system 1 may include another apparatus.

Hardware Configuration of MFP

Figure 2:
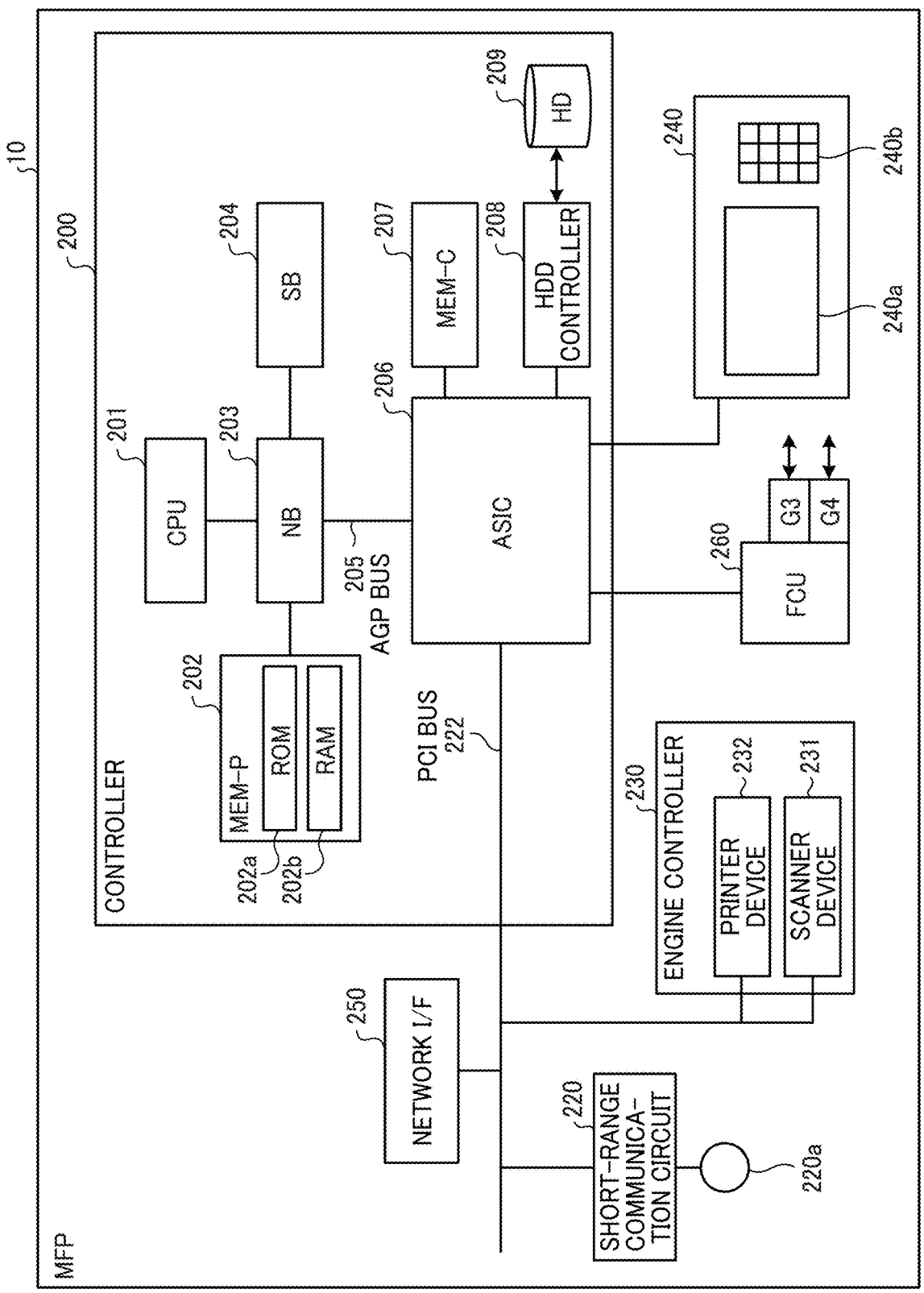
FIG. 2 is a diagram illustrating an example of a hardware configuration of an MFP, according to an embodiment of the present disclosure.

FIG. 2 is a diagram illustrating an example of a hardware configuration of the MFP according to the embodiment. The hardware configuration of the MFP 10 according to the embodiment will be described with reference to FIG. 2.

As illustrated in FIG. 2, the MFP 10 according to the embodiment includes a controller 200, a short-range communication circuit 220, an engine controller 230, a control panel 240, a network interface (I/F) 250, and a facsimile control unit (FCU) 260.

The controller 200 controls of the entire MFP 10. For example, the controller 200 controls rendering, communication, and inputs on the control panel 240. The controller 200 includes a central processing unit (CPU) 201 as a main processor, a system memory (MEM-P) 202, a northbridge (NB) 203, a southbridge (SB) 204, an application-specific integrated circuit (ASIC) 206, a local memory (MEM-C) 207, a hard disk drive (HDD) controller 208, and a hard disk (HD) 209. The NB 203 and the ASIC 206 are coupled to each other by an Accelerated Graphics Port (AGP) bus 205.

The CPU 201 is a processing circuit that controls the entire MFP 10. The NB 203 is a bridge that couples the CPU 201, the MEM-P 202, the SB 204, and the AGP bus 205 to one another. The NB 203 includes a memory controller that controls reading from and writing to the MEM-P 202, a Peripheral Component Interconnect (PCI) master, and an AGP target. The MEM-P 202 includes a read-only memory (ROM) 202a and a random access memory (RAM) 202b. The ROM 202a is a memory for storing a program and data that implement functions of the controller 200. The RAM 202b is used as a memory for loading the program and the data and as a rendering memory at the time of memory printing. The program stored in the RAM 202b may be stored on a computer-readable recording medium, such as a compact disc-read only memory (CD-ROM), compact disc-recordable (CD-R), or digital versatile disc (DVD), as a file of an installable format or an executable format and be provided.

The SB 204 is a bridge that couples the NB 203 to a PCI device or a peripheral device. The ASIC 206 is an image-processing-application-specific integrated circuit (IC) including hardware components for image processing. The ASIC 206 has a role of a bridge that couples the AGP bus 205, a PCI bus 222, the MEM-C 207, and the HDD controller 208 to one another. The ASIC 206 includes a PCI target, an AGP master, an arbiter (ARB) serving as a central processor of the ASIC 206, a memory controller that controls the MEM-C 207, a plurality of direct memory access controllers (DMACs) that perform rotation or the like of image data with a hardware logic, and a PCI unit that transfers data to a scanner device 231 and a printer device 232 via the PCI bus 222. The ASIC 206 may be coupled to a Universal Serial Bus (USB) interface, or an Institute of Electrical and Electronics Engineers 1394 (IEEE1394) interface.

The MEM-C 207 is a local memory used as an image buffer for copying and a code buffer. The HD 209 is a storage that stores image data, font data used in printing, and forms. The HDD controller 208 controls reading of data from and writing of data to the HD 209 under the control of the CPU 201.

The AGP bus 205 is a bus interface for a graphics accelerator card that is devised for accelerating processing of graphics. The AGP bus 205 directly accesses the MEM-P 202 with high throughput to be able to accelerate processing of the graphics accelerator card.

The short-range communication circuit 220 is a communication circuit for Near Field Communication (NFC), Bluetooth (registered trademark), or the like. A communication device 220a that performs wireless communication is coupled to the short-range communication circuit 220. The short-range communication circuit 220 is electrically coupled to the ASIC 206 through the PCI bus 222.

The engine controller 230 includes the scanner device 231 that implements the scanner function, and the printer device 232 that implements the printer function. The scanner device 231 or the printer device 232 includes a portion for image processing such as error diffusion and gamma conversion.

The control panel 240 displays a screen of setting values currently set, a selection screen, and so on. The control panel 240 includes a panel display 240a such as a touch panel that accepts input from a user, and a key operation device 240b including numeral keys that accept setting values of image forming conditions such as color density setting conditions and a start key that accepts a copy start instruction, for example.

The network I/F 250 is an interface used for performing data communication using the LAN 2. The network I/F 250 is electrically coupled to the ASIC 206 through the PCI bus 222.

With an application switching key of the control panel 240, the user can sequentially switch between a document box function, a copy function, a printer function, and a fax function of the MFP 10 to select one of the functions. When the document box function is selected, the MFP 10 enters a document box mode. When the copy function is selected, the MFP 10 enters a copy mode. When the printer function is selected, the MFP 10 enters a printer mode. When the fax function is selected, the MFP 10 enters a fax mode.

Software Configuration of MFP

Figure 3:
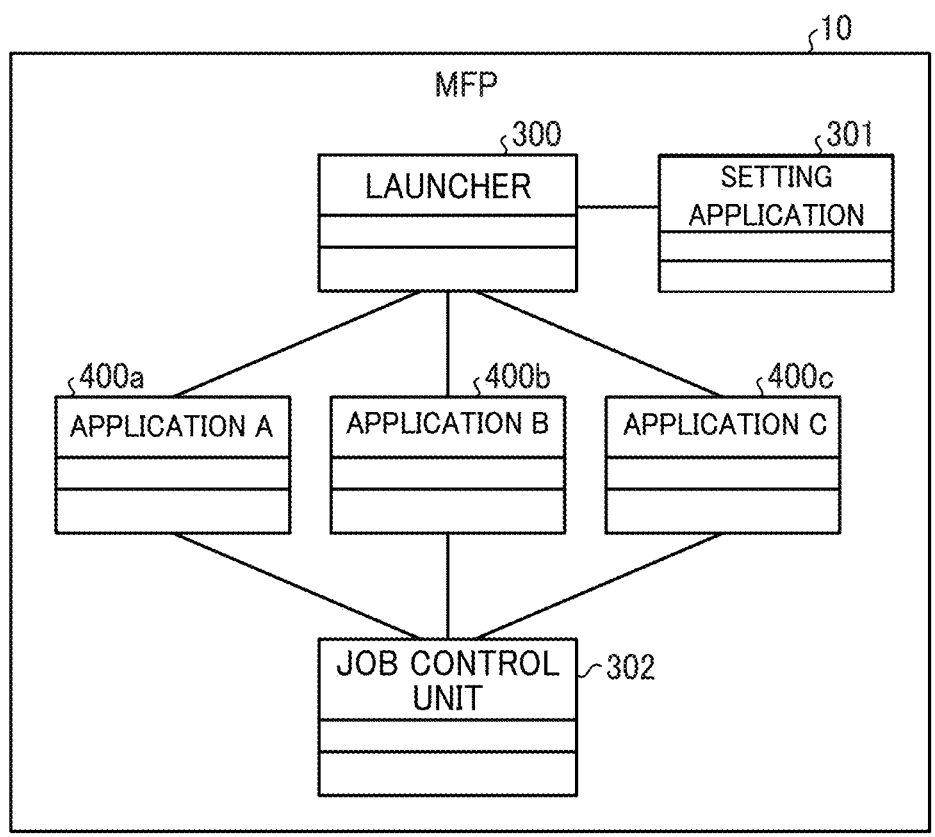
FIG. 3 is a diagram illustrating an example of a software configuration of the MFP, according to an embodiment of the present disclosure.

FIG. 3 is a diagram illustrating an example of a software configuration of the MFP according to the embodiment. The software configuration of the MFP 10 according to the embodiment will be described with reference to FIG. 3.

As illustrated in FIG. 3, the MFP 10 according to the embodiment includes a launcher 300, a setting application 301, and a job control unit 302, which are installed on the MFP 10 as main software. The MFP 10 also includes, for example, an application A 400a, an application B 400b, and an application C 400c, which are installed on the MFP 10 as applications enabling the use of the copy function, the scanner function, the fax function, the printer function, and so on. The application A 400a, the application B 400b, and the application C 400c are each classified into one or more corresponding function categories. The function category indicates a category of each of the functions of the MFP. In the embodiment, the description will be given on the assumption that there are function categories of copy, scanner, fax, printer, browser, and document box.

The launcher 300 is software that performs processing such as registration and updating on information such as information associating each application with a function category and information regarding a setting for displaying/not-displaying each app icon to manage the information.

The setting application 301 is, for example, an application that allows a user to make a display/non-display setting for each function category on a setting screen serving as a user interface (UI).

The job control unit 302 is software that controls each application executed on the MFP or a job accepted from extraneous sources.

Note that the software illustrated in FIG. 3 is typical software installed on the MFP 10. Thus, the installed software is not limited to these kinds of software.

Functional Configuration and Operation of MFP

Figure 4:
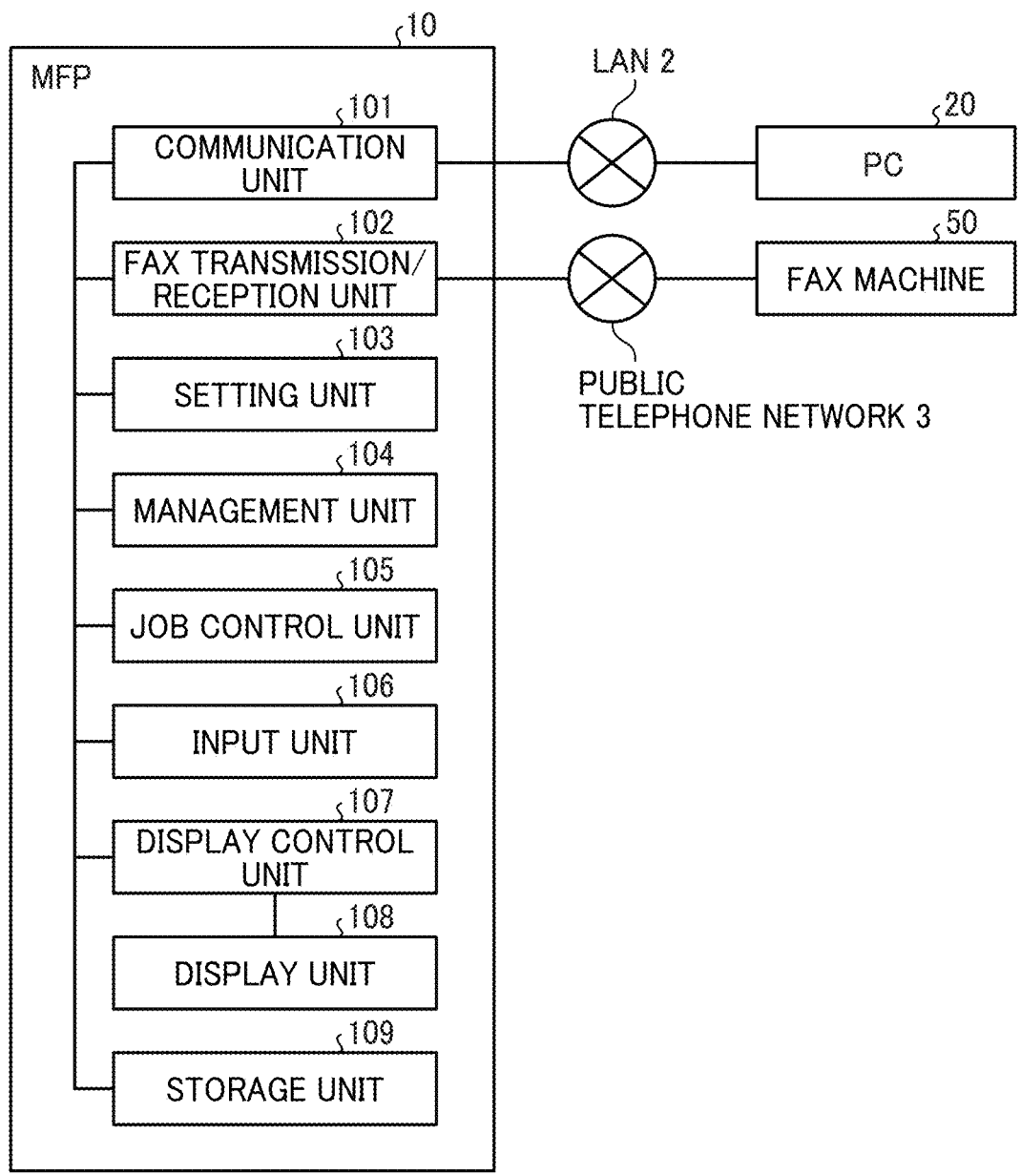
FIG. 4 is a block diagram illustrating an example of a functional configuration of the MFP, according to an embodiment of the present disclosure.

FIG. 4 is a block diagram illustrating an example of a functional configuration of the MFP according to the embodiment. The functional configuration of the MFP 10 according to the embodiment will be described with reference to FIG. 4.

As illustrated in FIG. 4, the MFP 10 according to the embodiment includes a communication unit 101, a fax transmission/reception unit 102, a setting unit 103, a management unit 104, a job control unit 105, an input unit 106, a display control unit 107, a display unit 108, and a storage unit 109.

The communication unit 101 is a functional unit that performs data communication with an external apparatus such as the PCs 20 via the LAN 2. The communication unit 101 is implemented, for example, as a result of the CPU 201 illustrated in FIG. 2 executing a program or by the network I/F 250.

The fax transmission/reception unit 102 is a functional unit that transmits and receives a fax to and from the external fax machine 50 via the public telephone network 3. The fax transmission/reception unit 102 is implemented, for example, as a result of the CPU 201 illustrated in FIG. 2 executing a program or by the FCU 260.

The setting unit 103 is a functional unit that makes a display/non-display setting for each function category, for example, in accordance with a user input operation on the input unit 106. The setting unit 103 is implemented, for example, as a result of the CPU 201 illustrated in FIG. 2 executing a program (the setting application 301 illustrated in FIG. 3).

The management unit 104 is a functional unit that performs processing such as registration and updating, on information such as information associating each application with a function category (for example, an application function category table 1200 (described later) illustrated in FIG. 7) and information regarding a setting for displaying/not displaying each app icon (for example, a display setting table 1100 (described later) illustrated in FIG. 6) to manage the information. The management unit 104 is implemented, for example, as a result of the CPU 201 illustrated in FIG. 2 executing a program (the launcher 300 illustrated in FIG. 3).

The job control unit 105 is a functional unit that controls each application executed on the MFP or a job accepted from an external apparatus. The job control unit 105 is implemented, for example, as a result of the CPU 201 illustrated in FIG. 2 executing a program (the job control unit 302 illustrated in FIG. 3).

The input unit 106 is a functional unit that accepts an operation input by a user. The input unit 106 is implemented by, at least one of the touch input function of the panel display 240a and the key operation device 240b illustrated in FIG. 2.

The display control unit 107 is a functional unit that controls a display operation of the display unit 108. For example, the display control unit 107 performs control to display a home screen or various setting screens and performs an operation for switching between display and non-display of an app icon on the basis of an instruction from the management unit 104. The display control unit 107 is implemented, for example, as a result of the CPU 201 illustrated in FIG. 2 executing a program.

The display unit 108 is a functional unit that displays various kinds of information under the control of the display control unit 107. The display unit 108 is implemented by the display function of the panel display 240a illustrated in FIG. 2.

The storage unit 109 is a functional unit that stores data of a received job and various kinds of setting information, for example. The storage unit 109 is implemented by the HD 209 illustrated in FIG. 2.

Note that the functional units of the MFP 10 illustrated in FIG. 4 represent conceptual functions and are not limited to such a configuration. For example, the plurality of functional units illustrated as independent functional units of the MFP 10 in FIG. 4 may be configured as a single functional unit. Conversely, the function of one of the functional units of the MFP 10 illustrated in FIG. 4 may be divided and configured as a plurality of functional units.

FIGS. 5A and 5B are diagrams each illustrating an example of a display/non-display setting screen displayed by the MFP according to the embodiment. FIG. 6 is a diagram illustrating an example of a display setting table. An overview of a setting operation performed on a display/non-display setting screen 1001 will be described next with reference to FIGS. 5A to 6.

In response to a user performing an input operation for displaying the display/non-display setting screen 1001 illustrated in FIG. 5A on the input unit 106, the display control unit 107 causes the display unit 108 to display the display/non-display setting screen 1001. The display/non-display setting screen 1001 illustrated in FIGS. 5A and 5B indicates a state in which settings are made to display ("Display" is set for) all the function categories of copy, scanner, fax, printer, browser, and document box.

In response to the user performing a tap operation on a portion "Application(s) of Copy Function" in the display/non-display setting screen 1001, for example, the display control unit 107 causes the display unit 108 to display a display/non-display dialog box 1002 illustrated in FIG. 5B.

The display/non-display dialog box 1002 is a dialog box for making a setting for displaying or not displaying app icons of applications belonging to the function category of copy. As illustrated in FIG. 5B, the display/non-display dialog box 1002 includes radio buttons 1003, a cancel button 1004, and an OK button 1005. The radio buttons 1003 are buttons for selecting whether or not to display app icons. The cancel button 1004 is a button for invalidating the content of the setting selected with the radio button 1003 and for closing the display/non-display dialog box 1002. The OK button 1005 is a button for updating the display setting table 1100 illustrated in FIG. 6 to the setting content selected with the radio button 1003.

As illustrated in FIG. 6, the display setting table 1100 is a table that associates each function category, a display setting (an example of restriction information) for displaying or not displaying app icons, and the presence or absence of a job indicating whether a job belonging to the function category has been received with one another and is stored and managed in the storage unit 109. For example, in the example of the display setting table 1100 illustrated in FIG. 6, the display setting and the presence or absence of a job for the function category of scanner are "NOT DISPLAY" and "ABSENT", respectively. This indicates that a setting is made not to display app icons of applications belonging to the function category of scanner. Note that information is stored in a table format in the display setting table 1100; however, the format of the information is not limited to this one. The information may be stored in any format as long as values in the respective columns of the table can be managed in association with one another.

The display setting table 1100 illustrated in FIG. 6 associates each function category with a display setting for displaying or not displaying app icons; however, the association is not limited to this one. The display setting in the display setting table 1100 illustrated in FIG. 6 is a setting as to whether to display app icons for starting applications that enable the use of a function indicated by the corresponding function category. Therefore, the display setting ultimately indicates a setting as to whether to permit or restrict the use of the function. Thus, the display setting table 1100 may associate each function category with information (restriction information) indicating whether to permit or restrict the use of a function indicated by the function category.

For example, it is assumed that the user selects the radio button 1003 of "Not Display" and presses the OK button 1005. Then, the setting unit 103 confirms the content of the setting for not displaying app icons of applications belonging to the function category of copy, and notifies the management unit 104 of the setting content. The management unit 104 updates the display setting stored in the display setting table 1100 illustrated in FIG. 6, in accordance with the setting content which the management unit 104 is notified of. Specifically, since the setting content indicates that app icons of applications belonging to the function category of copy are not displayed, the management unit 104 updates the display setting of the row for the function category of "COPY" to "NOT DISPLAY" in the display setting table 1100. After the management unit 104 finishes the processing for updating the display setting table 1100, the display control unit 107 changes the display setting for "Application(s) of Copy Function" to "Not Display" and displays the result in the display/non-display setting screen 1001.

Figure 9:
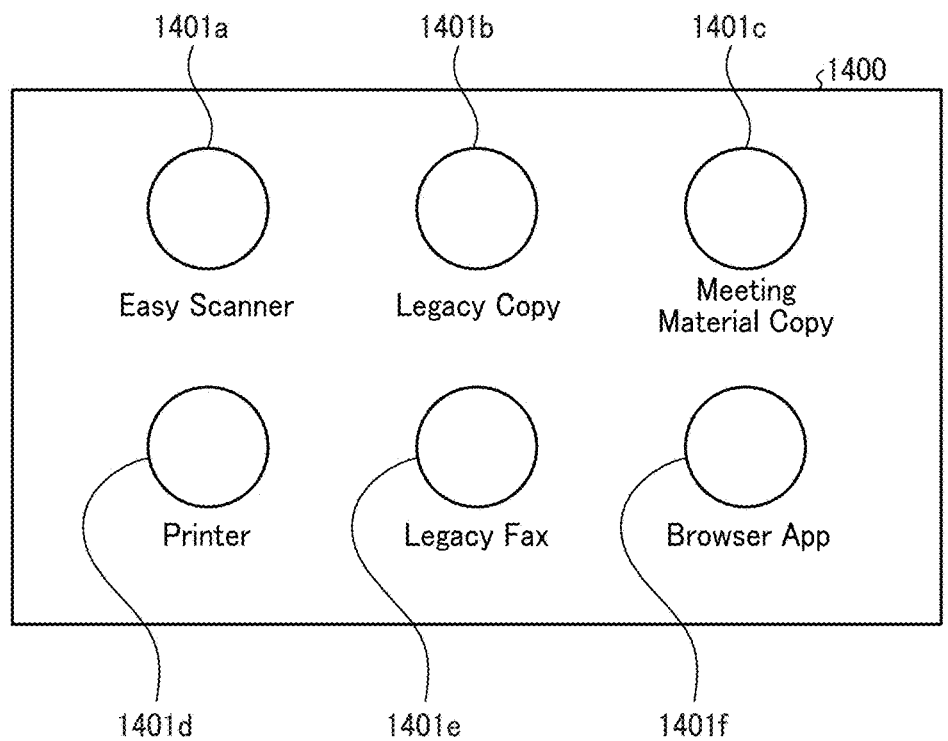
FIG. 9 is a diagram illustrating an example of a home screen, according to an embodiment of the present disclosure.
Figure 10:
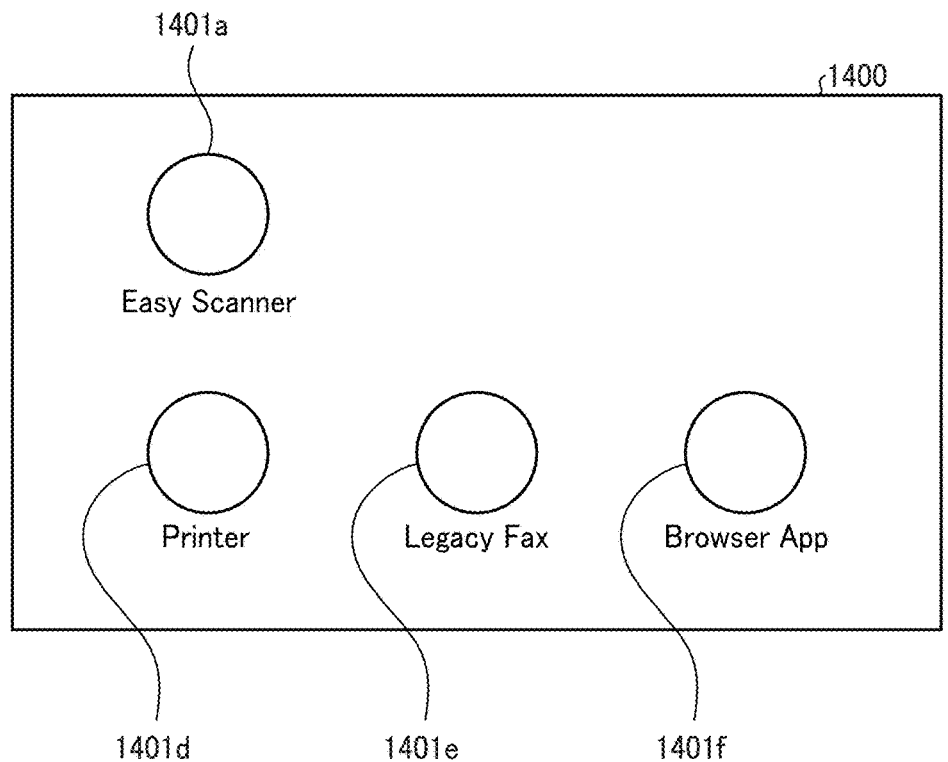
FIG. 10 is a diagram illustrating an example of a state in which icons of applications associated with one of functions are not displayed in the home screen, according to an embodiment of the present disclosure.

FIG. 7 is a diagram illustrating an example of an application function category table. FIG. 8 is a diagram illustrating an example of a job function category table. FIG. 9 is a diagram illustrating an example of a home screen. FIG. 10 is a diagram illustrating an example of a state in which icons of applications associated with one of functions are not displayed in the home screen. An overview of an operation for displaying and not displaying app icons in the home screen will be described next with reference to FIGS. 7 to 10.

The application function category table 1200 (an example of first information) illustrated in FIG. 7 is a table that associates a name of each application (application name) with one or more function categories and is stored and managed in the storage unit 109. That is, the application function category table 1200 associates each application with one or more of the functions of the MFP 10. For example, the example of the application function category table 1200 illustrated in FIG. 7 indicates that the function category for an application name "MEETING MATERIAL COPY" is copy. For example, which function category each application is associated with may be set by an administrator when the application is installed. Alternatively, the management unit 104 may identify information or the like indicating the application type of each application and register the application in association with the corresponding function category. Note that the application name is information for identifying an application. Information for identifying an application is not limited to the application name and may be, for example, a unique identification number assigned to each application. Information is stored in a table format in the application function category table 1200; however, the format of the information is not limited to this one. The information may be stored in any format as long as values in the respective columns of the table can be managed in association with one another.

The job function category table 1300 (an example of second information) illustrated in FIG. 8 is a table that associates a name of a job (job name) with a function category and is stored and managed in the storage unit 109. That is, the job function category table 1300 associates each job with one of the functions of the MFP 10. For example, the example of the job function category table 1300 illustrated in FIG. 8 indicates that the function category for a job name "PRINT/STORE" is "PRINTER". For example, which function category each job is associated with may be set by an administrator. Alternatively, the management unit 104 may identify information indicating the type of each job and register the job in association with the corresponding function category. Note that the job name is information for identifying a job. Information for identifying a job is not limited to the job name and may be, for example, unique distinguishing information for distinguishing the job. Information is stored in a table format in the job function category table 1300; however, the format of the information is not limited to this one. The information may be stored in any format as long as values in the respective columns of the table can be managed in association with one another.

For example, document data is transmitted by fax from the fax machine 50, and the job control unit 105 receives the document data as a fax job. In such a case, the management unit 104 refers to the job function category table 1300 to identify that the fax job corresponds to the function category of fax. The management unit 104 then refers to the display setting table 1100 illustrated in FIG. 6 and changes the presence or absence of a job corresponding to the identified function category (fax) to "PRESENT" to update the display setting table 1100. This is processing for displaying app icons of applications corresponding to the function category of fax even when the display setting for the function category is "NOT DISPLAY". Note that a process performed in response to the job control unit 105 receiving a job will be described in detail later with reference to FIGS. 13 to 15.

A home screen 1400 illustrated in FIG. 9 is a screen that is displayed on the display unit 108 by the display control unit 107 and that displays app icons for starting respective applications. The home screen 1400 illustrated in FIG. 9 displays an app icon 1401*a* of an application having an application name "Easy Scanner", an app icon 1401*b* of an application having an application name "Legacy Copy", and an app icon 1401*c* of an application having an application name "Meeting Material Copy". The home screen 1400 further displays an app icon 1401*d* of an application having an application name "Printer", an app icon 1401*e* of an application having an application name "Legacy fax", and an app icon 1401*f* of an application having an application name "Browser App". Note that FIG. 9 illustrates an example in which the app icons are displayed in the home screen 1400; however, the screen displaying the app icons is not limited to the home screen 1400 and the app icons may be displayed in another screen as required.

For example, it is assumed that a user performs a tap operation on a portion "Application(s) of Copy Function" on the display/non-display setting screen 1001 illustrated in FIG. 5A described above, in response to which the management unit 104 updates the display setting of the row of the function category "COPY" to "NOT DISPLAY" in the display setting table 1100. The user then performs an operation to display the home screen 1400 again. Then, the management unit 104 refers to the application function category table 1200 to identify which function category each application registered in the home screen 1400 corresponds to. The management unit 104 then refers to the display setting table 1100 to check the display setting corresponding to the identified function category, associates the display setting with each application, and transmits the association information to the display control unit 107. The display control unit 107 switches between display and non-display of app icons (the app icons 1401*a* to 1401*o* of the respective applications in accordance with the information associating the display setting with each application and received from the management unit 104. In the above case, since the display setting of the function category of copy is "NOT DISPLAY", the display control unit 107 causes the display unit 108 not to display the app icons 1401*b* and 1401*c* of "Legacy Copy" and "Meeting Material Copy" that belong to the function category of copy and to display the other app icons as in the home screen 1400 illustrated in FIG. 10.

The home screen 1400 illustrated in FIG. 10 indicates an example in which app icons of applications belonging to a function category whose display setting is "NOT DISPLAY" are not seen completely; however, the configuration is not limited to this one. For example, the app icons may be grayed out. That is, app icons are not displayed or are grayed out, for example, to create a display state indicating that applications corresponding to the app icons are not to be started. Therefore, the "display state" mentioned herein is a concept including a state in which app icons are not displayed.

App Icon Display Setting Process and App Icon Display/Non-Display Operation

Figure 11:
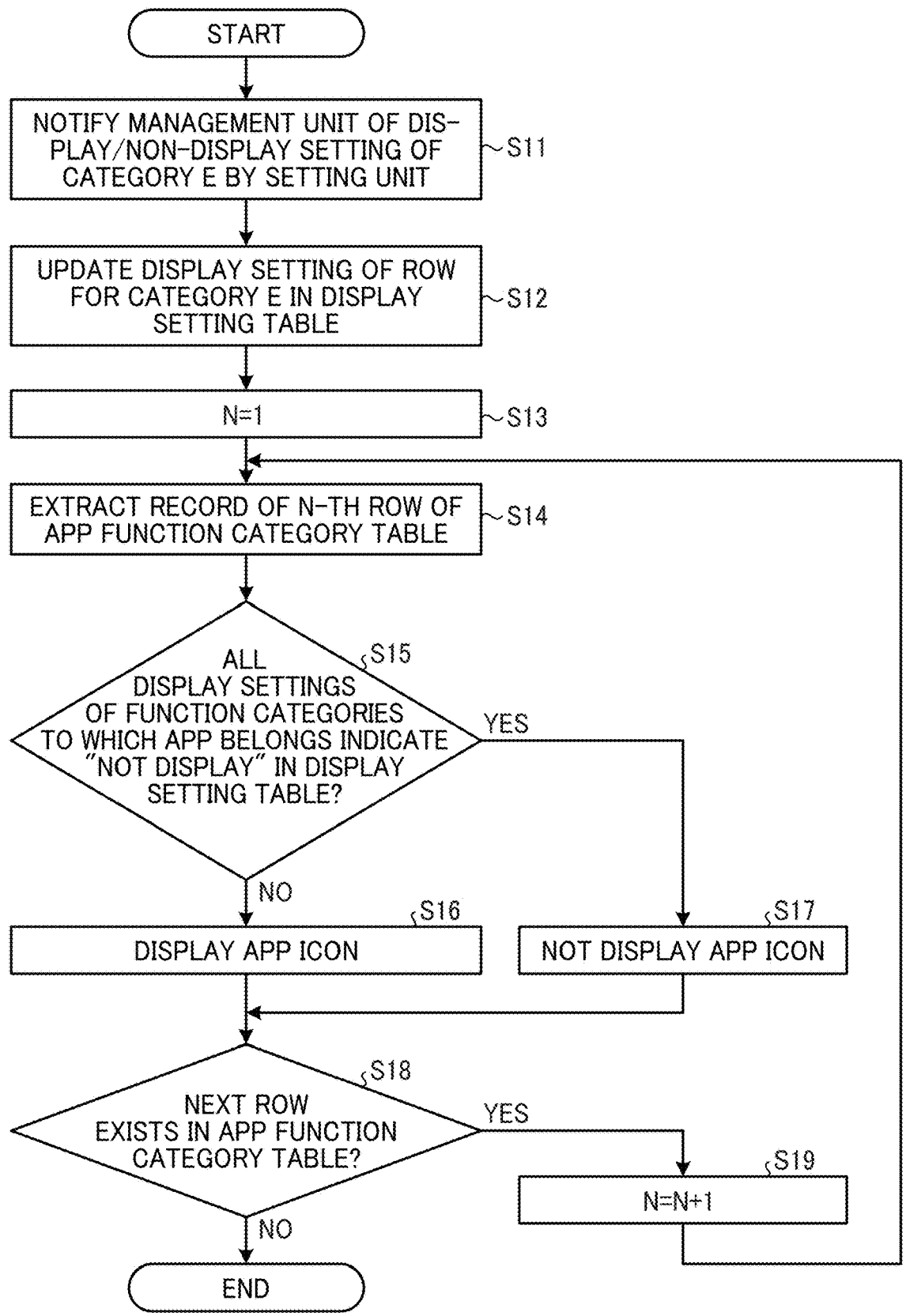
FIG. 11 is a flowchart illustrating an example of an app icon display setting process and an app icon display/non-display operation performed by the MFP, according to an embodiment of the present disclosure.

FIG. 11 is a flowchart illustrating an example of an app icon display setting process and an app icon display/non-display operation performed by the MFP according to the embodiment. Procedures of the app icon display setting process and the app icon display/non-display operation will be described with reference to FIG. 11.

<Step S11>

The setting unit 103 confirms setting content as to whether to display or not display app icons of applications belonging to a specific function category (hereinafter referred to as a category E) in accordance with an input operation performed by a user on the display/non-display setting screen 1001, and notifies the management unit 104 of the setting content. The process then proceeds to step S12.

<Step S12>

The management unit 104 updates a display setting of a row of the category E in the display setting table 1100 in accordance with the setting content which the management unit 104 is notified of. The process then proceeds to step S13.

<Step S13>

The management unit 104 initializes a variable N indicating the row number of the application function category table 1200 to 1. The process then proceeds to step S14.

<Steps S14 and S15>

The management unit 104 refers to the application function category table 1200 and extracts a record of the N-th row. The management unit 104 then refers to the display setting table 1100 to determine whether all the display settings corresponding to the function categories to which an application indicated by the extracted record of the N-th row belongs are "NOT DISPLAY". For example, when the extracted record of the N-th row is a record of the 11-th row, the function categories to which the application having the application name "MEDIUM PRINT & SCAN" belongs are "SCANNER" and "PRINTER". Thus, the management unit 104 determines whether all the display settings corresponding to the function categories of scanner and printer are "NOT DISPLAY" in the display setting table 1100. If all the display settings are not "NOT DISPLAY" (NO in step S15), the process proceeds to step S16. If all the display settings are "NOT DISPLAY" (Yes in step S15), the process proceeds to step S17.

<Step S16>

The management unit 104 transmits information associating the application indicated by the record of the N-th row with the display setting indicating "DISPLAY" to the display control unit 107. The display control unit 107 causes an app icon of the application indicated by the record of the N-th row to be displayed, in accordance with the association information when the home screen 1400 is displayed. The process then proceeds to step S18.

<Step S17>

The management unit 104 transmits information associating the application indicated by the record of the N-th row with the display setting indicating "NOT DISPLAY" to the display control unit 107. The display control unit 107 causes an app icon of the application indicated by the record of the N-th row not to be displayed, in accordance with the association information when the home screen 1400 is displayed. The process then proceeds to step S18.

<Step S18>

The management unit 104 determines whether there is the next row (record of the (N+1)-th row) in the application function category table 1200. If there is the next row (Yes in step S18), the process proceeds to step S19. If there is not the next row (No in step S18), the process ends.

<Step S19>

The management unit 104 increments the variable N. The process then returns to step S14.

Through steps S11 to S19 described above, the app icon display setting process and the app icon display/non-display operation are performed.

Figure 12:
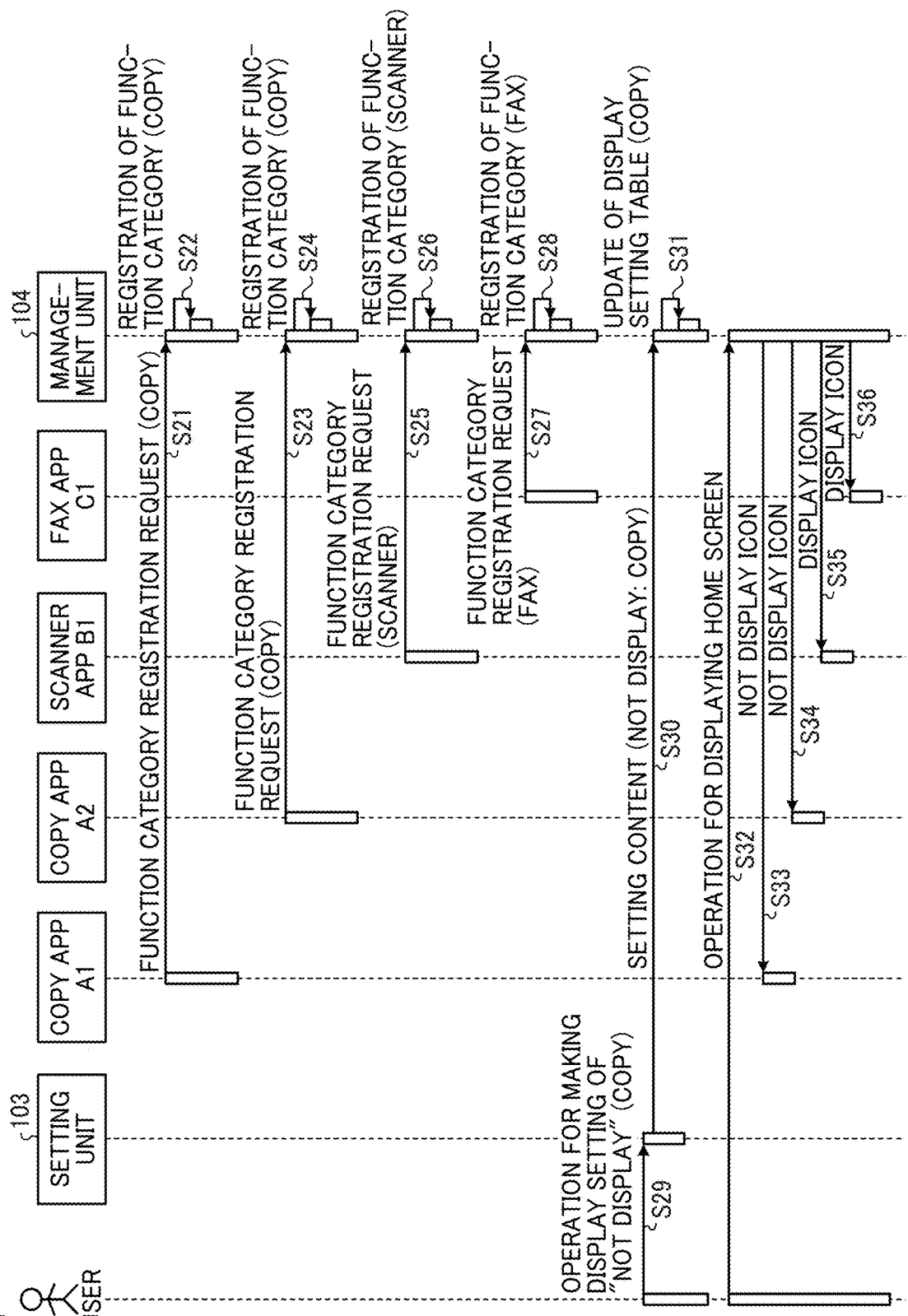
FIG. 12 is a sequence diagram illustrating an example of the app icon display setting process and the app icon display/non-display operation performed by the MFP, according to an embodiment of the present disclosure.

FIG. 12 is a sequence diagram illustrating an example of the app icon display setting process and the app icon display/non-display operation performed by the MFP according to the embodiment. The app icon display setting process and the app icon display/non-display operation will be described next with reference to FIG. 12 by explicitly indicating a data flow.

<Steps S21 and S22>

For example, an application "COPY APP A1" transmits a function category registration request for requesting registration of a function category together with information indicating the type of the application to the management unit 104 at a timing when the application "COPY APP A1" is installed. In response to reception of the function category registration request from the application "COPY APP A1", the management unit 104 registers the application name "COPY APP A1" and the function category "COPY" in association with each other in the application function category table 1200 on the basis of the information indicating the type of the application.

<Steps S23 and S24>

For example, an application "COPY APP A2" transmits a function category registration request for requesting registration of a function category together with information indicating the type of the application to the management unit 104 at a timing when the application "COPY APP A2" is installed. In response to reception of the function category registration request from the application "COPY APP A2", the management unit 104 registers the application name "COPY APP A2" and the function category "COPY" in association with each other in the application function category table 1200 on the basis of the information indicating the type of the application.

<Steps S25 and S26>

For example, an application "SCANNER APP B1" transmits a function category registration request for requesting registration of a function category together with information indicating the type of the application to the management unit 104 at a timing when the application "SCANNER APP B1" is installed. In response to reception of the function category registration request from the application "SCANNER APP B1", the management unit 104 registers the application name "SCANNER APP B1" and the function category "SCANNER" in association with each other in the application function category table 1200 on the basis of the information indicating the type of the application.

<Steps S27 and S28>

For example, an application "FAX APP C1" transmits a function category registration request for requesting registration of a function category together with information indicating the type of the application to the management unit 104 at a timing when the application "FAX APP C1" is installed. In response to reception of the function category registration request from the application "FAX APP C1", the management unit 104 registers the application name "FAX APP C1" and the function category "FAX" in association with each other in the application function category table 1200 on the basis of the information indicating the type of the application.

<Steps S29 and S30>

For example, it is assumed that the user performs a tap operation on a portion "Application(s) of Copy Function" on the display/non-display setting screen 1001 to perform an operation to set "NOT DISPLAY". Then, the setting unit 103 confirms the content of the setting for not displaying app icons of applications belonging to the function category of copy, and notifies the management unit 104 of the setting content.

<Step S31>

The management unit 104 updates a display setting of a record whose function category is copy in the display setting table 1100 to "NOT DISPLAY", in accordance with the setting content which the management unit 104 is notified of.

<Steps S32 to S36>

It is assumed that a user then performs an input operation on the input unit 106 and that the display control unit 107 causes the display unit 108 to display the home screen 1400. In this case, the management unit 104 transmits, with reference to the display setting table 1100, information associating applications (the above-described four applications in this case) indicated by the respective records in the application function category table 1200 with corresponding display settings indicating "DISPLAY" or "NOT DISPLAY" to the display control unit 107. The display control unit 107 causes app icons of the respective applications to be displayed or not to be displayed in the home screen 1400 in accordance with the received association information. Specifically, since the display settings associated with the applications "COPY APP A1" and "COPY APP A2" are "NOT DISPLAY", the display control unit 107 causes the app icons of these applications not to be displayed. Since the display settings associated with the applications "SCANNER APP B1" and "FAX APP C1" are "DISPLAY", the display control unit 107 causes the app icons of these applications to be displayed.

Through steps S21 to S36 described above, the app icon display setting process and the app icon display/non-display operation are performed.

Figure 13:
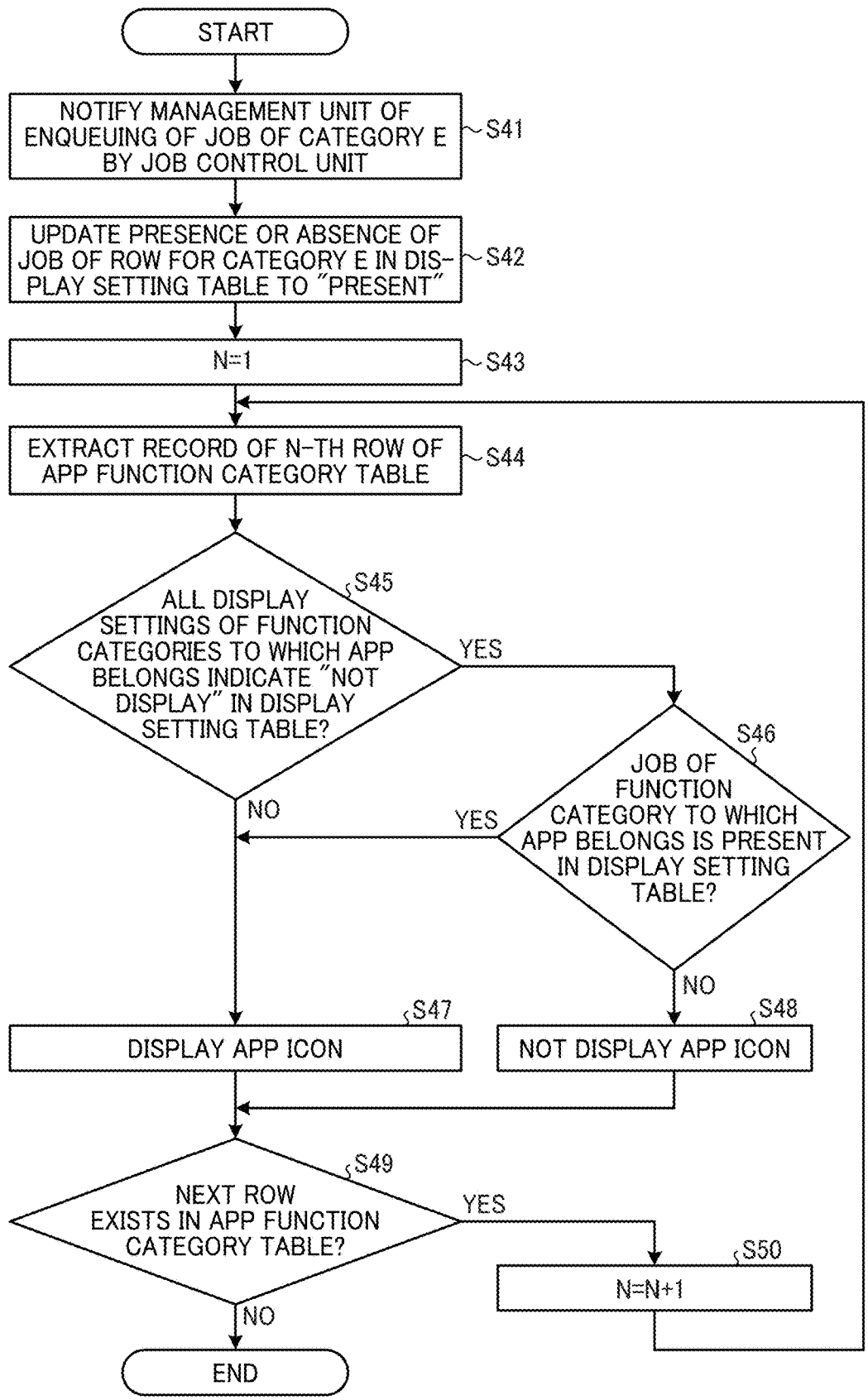
FIG. 13 is a flowchart illustrating an example of the app icon display/non-display operation performed by the MFP when a job is enqueued, according to an embodiment of the present disclosure.

App Icon Display/Non-Display Operation at Enqueuing of Job FIG. 13 is a flowchart illustrating an example of the app icon display/non-display operation performed by the MFP according to the embodiment when a job is enqueued. A procedure of the app icon display/non-display operation when a job is enqueued will be described with reference to FIG. 13.

<Step S41>

When obtaining a job (such as a print job or a fax job) from an external apparatus via the communication unit 101 or the fax transmission/reception unit 102, the job control unit 105 notifies the management unit 104 of enqueuing of a job. The process then proceeds to step S42.

<Step S42>

In response to reception of the notification of enqueuing of a job, the management unit 104 refers to the job function category table 1300 to identify which function category the job belongs to. It is assumed that the identified function category is referred to as a category E. The management unit 104 updates the presence or absence of a job of a row for the category E in the display setting table 1100 to "PRESENT". The process then proceeds to step S43.

<Step S43>

The management unit 104 initializes a variable N indicating the row number of the application function category table 1200 to 1. The process then proceeds to step S44.

<Steps S44 and S45>

The management unit 104 refers to the application function category table 1200 and extracts a record of the N-th row. The management unit 104 then refers to the display setting table 1100 to determine whether all the display settings corresponding to the function categories to which an application indicated by the extracted record of the N-th row belongs are "NOT DISPLAY". For example, when the extracted record of the N-th row is a record of the 11-th row, the function categories to which the application having the application name "MEDIUM PRINT & SCAN" belongs are "SCANNER" and "PRINTER". Thus, the management unit 104 determines whether all the display settings corresponding to the function categories of scanner and printer are "NOT DISPLAY" in the display setting table 1100. If all the display settings are not "NOT DISPLAY" (NO in step S45), the process proceeds to step S47. If all the display settings are "NOT DISPLAY" (Yes in step S45), the process proceeds to step S46.

<Step S46>

The management unit 104 determines whether the presence or absence of a job corresponding to the function category to which the application indicated by the record of the N-th row of the application function category table 1200 belongs is "PRESENT" in the display setting table 1100. If there is a job corresponding to the function category (Yes in step S46), the process proceeds to step S47. If there is no job corresponding to the function category (No in step S46), the process proceeds to step S48.

<Step S47>

The management unit 104 transmits information associating the application indicated by the record of the N-th row with the display setting indicating "DISPLAY" to the display control unit 107. The display control unit 107 causes an app icon of the application indicated by the record of the N-th row to be displayed, in accordance with the association information when the home screen 1400 is displayed. The process then proceeds to step S49.

<Step S48>

The management unit 104 transmits information associating the application indicated by the record of the N-th row with the display setting indicating "NOT DISPLAY" to the display control unit 107. The display control unit 107 causes an app icon of the application indicated by the record of the N-th row not to be displayed, in accordance with the association information when the home screen 1400 is displayed. The process then proceeds to step S49.

<Step S49>

The management unit 104 determines whether there is the next row (record of the (N+1)-th row) in the application function category table 1200. If there is the next row (Yes in step S49), the process proceeds to step S50. If there is not the next row (No in step S49), the process ends.

<Step S50>

The management unit 104 increments the variable N. The process then returns to step S44.

Through steps S41 to S50 described above, the app icon display/non-display operation is performed when a job is enqueued.

Figure 14:
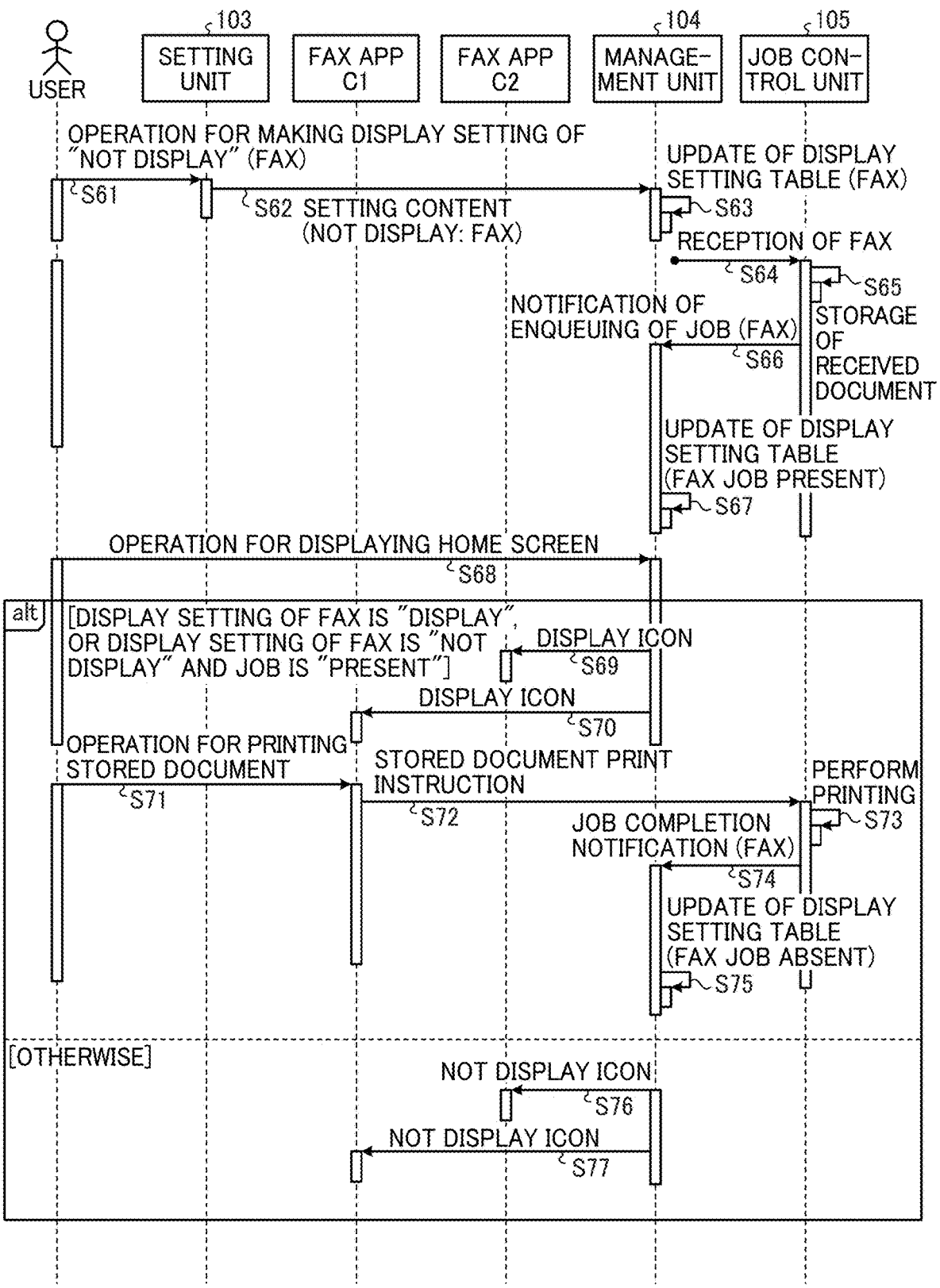
FIG. 14 is a sequence diagram illustrating an example of the app icon display/non-display operation performed by the MFP when a fax job is enqueued, according to an embodiment of the present disclosure.

FIG. 14 is a sequence diagram illustrating an example of the app icon display/non-display operation performed by the MFP according to the embodiment when a job for a fax is enqueued. The app icon display/non-display operation performed when a fax job is enqueued will be described next with reference to FIG. 14 by explicitly indicating a data flow.

<Steps S61 and S62>

It is assumed that a user performs a tap operation on a portion "Application(s) of Fax Function" on the display/non-display setting screen 1001 to perform an operation to set "NOT DISPLAY". Then, the setting unit 103 confirms the content of the setting for not displaying app icons of applications belonging to the function category of fax, and notifies the management unit 104 of the setting content.

<Step S63>

The management unit 104 updates a display setting of a row whose function category is fax in the display setting table 1100 to "NOT DISPLAY" in accordance with the setting content which the management unit 104 is notified of.

<Steps S64 to S66>

The job control unit 105 receives document data transmitted from the fax machine 50 as a fax job via the fax transmission/reception unit 102, and stores the fax job as a received document in the storage unit 109. The job control unit 105 then notifies the management unit 104 of enqueuing of a fax job.

<Step S67>

In response to reception of the notification indicating enqueuing of a fax job, the management unit 104 refers to the job function category table 1300 to identify that the fax job belongs to the function category of fax. The management unit 104 then updates the presence or absence of a job of a record whose function category is fax in the display setting table 1100 to "PRESENT" for management. In this way, it is registered that a job for any of applications belonging to the function category of fax is enqueued and stored.

<Step S68>

It is assumed that a user then performs an input operation on the input unit 106 and that the display control unit 107 causes the display unit 108 to display the home screen 1400. Behaviors of the app icons of the applications "FAX APP C1" and "FAX APP C2" that belong to the function category of fax will be described below. The management unit 104 refers to the display setting table 1100 to determine whether the display setting of the record whose function category is fax is "DISPLAY" or whether the display setting is "NOT DISPLAY" and the presence or absence of a job is "PRESENT". If the display setting of the record whose function category is fax "DISPLAY", or if the display setting of the record is "NOT DISPLAY" and the presence or absence of a job is "PRESENT", the process proceeds to step S69. If the display setting of the record whose function category is fax is "NOT DISPLAY" and the presence or absence of a job is "ABSENT", the process proceeds to step S76.

<Steps S69 and S70>

If the display setting of the record whose function category is fax is "DISPLAY" or if the display setting of the record is "NOT DISPLAY" and the presence or absence of a job is "PRESENT" in the display setting table 1100, the following processing is performed. The management unit 104 transmits information associating applications ("FAX APP C1" and "FAX APP C2" in this case) of records whose function category is fax in the application function category table 1200 with the display setting indicating "DISPLAY" to the display control unit 107. The display control unit 107 causes app icons of the applications "FAX APP C1" and "FAX APP C2" to be displayed in the home screen 1400 in accordance with the received association information.

<Steps S71 and S72>

The user performs a tap operation on the app icon of the application "FAX APP C1" or "FAX APP C2" displayed in the home screen 1400 to start the application. The user then performs a print output operation for the fax job stored as the received document in the storage unit 109 on a screen provided by the application that has been started. The application ("FAX APP C1" in FIG. 14) transmits a stored document print instruction for requesting print output of the fax job stored as the received document in the storage unit 109 to the job control unit 105 on the basis of the print output operation performed by the user.

<Steps S73 and S74>

In response to reception of the stored document print instruction, the job control unit 105 causes the printer device 232 to output the fax through printing on the basis of the fax job stored in the storage unit 109. After the printer device 232 completes outputting through printing, the job control unit 105 transmits a job completion notification regarding the fax job to the management unit 104.

<Step S75>

In response to reception of the job completion notification regarding the fax job, the management unit 104 updates the presence or absence of a job of the row whose function category is fax in the display setting table 1100 to "ABSENT" for management. In this way, it is registered that processing of a job for any of applications belonging to the function category of fax is completed and there is no job yet to be processed. Consequently, the app icons of the applications belonging to the function category of fax are no longer displayed.

<Steps S76 and S77>

If the display setting of the record whose function category is fax is "NOT DISPLAY" and the presence or absence of a job is "ABSENT" in the display setting table 1100, the following processing is performed. The management unit 104 transmits information associating applications ("FAX APP C1" and "FAX APP C2" in this case) of records whose function category is fax in the application function category table 1200 with the display setting indicating "NOT DISPLAY" to the display control unit 107. The display control unit 107 causes app icons of the applications "FAX APP C1" and "FAX APP C2" not to be displayed in the home screen 1400 in accordance with the received association information.

Through steps S61 to S77 described above, the app icon display/non-display operation is performed when a fax job is enqueued.

Figure 15:
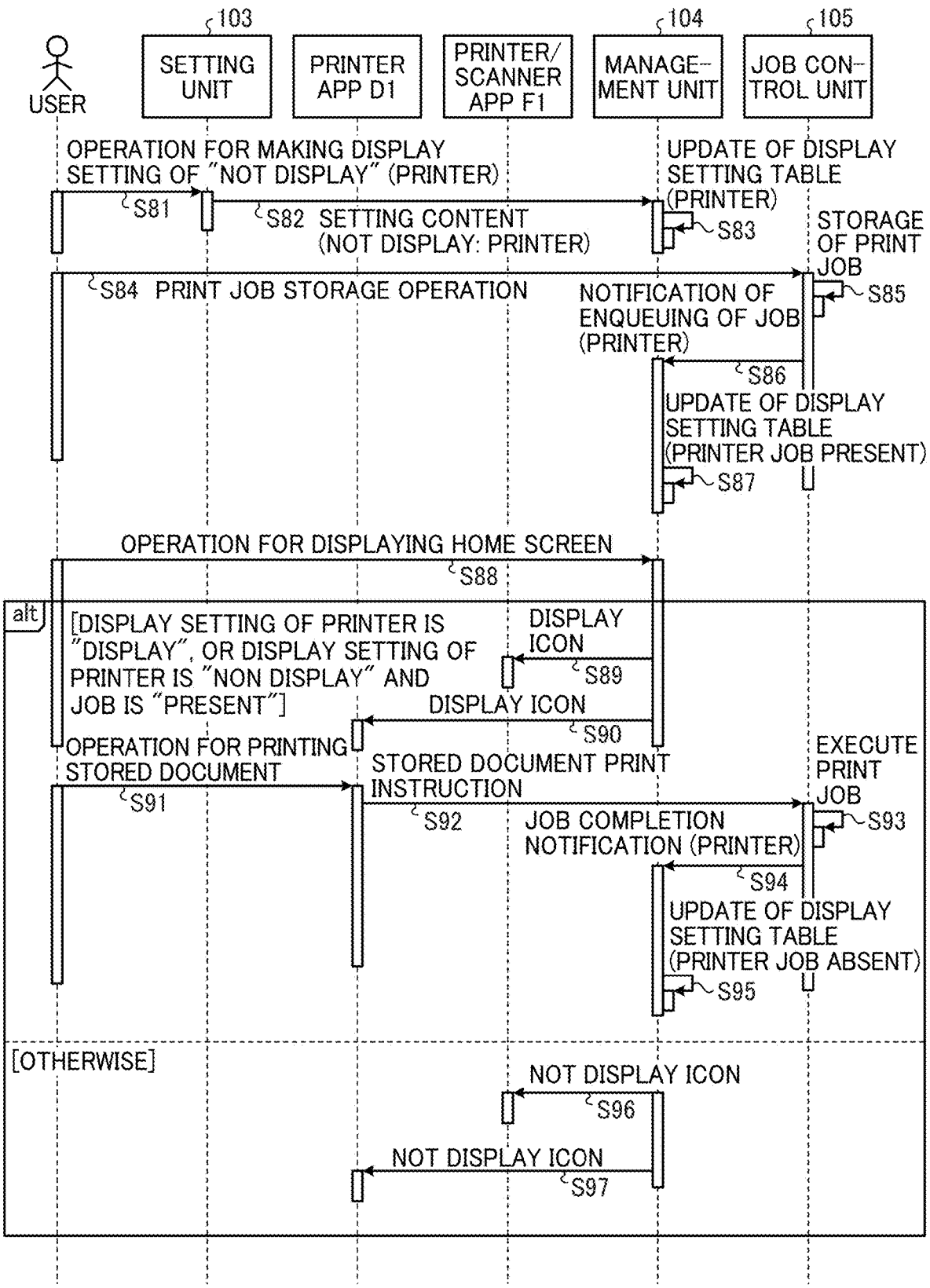
FIG. 15 is a sequence diagram illustrating an example of the app icon display/non-display operation performed by the MFP when a print job is enqueued, according to an embodiment of the present disclosure.

FIG. 15 is a sequence diagram illustrating an example of the app icon display/non-display operation performed by the MFP according to the embodiment when a print job is enqueued. The app icon display/non-display operation performed when a print job is enqueued will be described next with reference to FIG. 15 by explicitly indicating a data flow.

<Steps S81 and S82>

It is assumed that a user performs a tap operation on a portion "Application(s) of Printer Function" in the display/non-display setting screen 1001 to perform an operation to set "Not Display". Then, the setting unit 103 confirms the content of the setting for not displaying app icons of applications belonging to the function category of printer, and notifies the management unit 104 of the setting content.

<Step S83>

The management unit 104 updates a display setting of a row whose function category is printer in the display setting table 1100 to "NOT DISPLAY" in accordance with the setting content which the management unit 104 is notified of.

<Step S84>

The user performs an operation to store a print job. For example, the user transmits document data created using the PC 20 to the MFP 10 via the LAN 2.

<Steps S85 and S86>

The job control unit 105 acquires the document data transmitted, for example, from the PC 20 as a print job via the communication unit 101, and stores the print job in the storage unit 109. The job control unit 105 then notifies the management unit 104 of enqueuing of a print job.

<Step S87>

In response to reception of the notification of enqueuing of a print job, the management unit 104 refers to the job function category table 1300 to identify that the print job belongs to the function category of printer. The management unit 104 then updates the presence or absence of a job of a record whose function category is printer in the display setting table 1100 to "PRESENT" for management. In this way, it is registered that a job for any of applications belonging to the function category of printer is enqueued and stored.

<Step S88>

It is assumed that a user then performs an input operation on the input unit 106 and that the display control unit 107 causes the display unit 108 to display the home screen 1400. Behaviors of the app icons of the applications "PRINTER APP D1" and "PRINTER/SCANNER APP F1" that belong to the function category of printer will be described below. The management unit 104 refers to the display setting table 1100 to determine whether the display setting of the record whose function category is printer is "DISPLAY" or whether the display setting is "NOT DISPLAY" and the presence or absence of a job is "PRESENT". If the display setting of the record whose function category is printer is "DISPLAY" or if the display setting of the record is "NOT DISPLAY" and the presence or absence of a job is "PRESENT", the process proceeds to step S89. If the display setting of the record whose function category is printer is "NOT DISPLAY" and the presence or absence of a job is "ABSENT", the process proceeds to step S96.

<Steps S89 and S90>

If the display setting of the record whose function category is printer is "DISPLAY" or if the display setting of the record is "NOT DISPLAY" and the presence or absence of a job is "PRESENT" in the display setting table 1100, the following processing is performed. The management unit 104 transmits information associating applications ("PRINTER APP Dl" and "PRINTER/SCANNER APP F1") in this case) indicated by records whose function category is printer in the application function category table 1200 with the display setting indicating "DISPLAY" to the display control unit 107. The display control unit 107 causes app icons of the applications "PRINTER APP Dl" and "PRINTER/SCANNER APP F1" to be displayed in the home screen 1400 in accordance with the received association information.

<Steps S91 and S92>

The user performs a tap operation on the app icon of the application "PRINTER APP Dl" or "PRINTER/SCANNER APP F1" displayed in the home screen 1400 to start the application. The user then performs a print output operation for the print job stored in the storage unit 109 on a screen provided by the application that has been started. The application ("PRINTER APP Dl" in FIG. 15) transmits a stored document print instruction for requesting print output of the print job stored in the storage unit 109 to the job control unit 105 on the basis of the print output operation performed by the user.

<Steps S93 and S94>

In response to reception of the stored document print instruction, the job control unit 105 causes the printer device 232 to output the document through printing on the basis of the print job stored in the storage unit 109. After the printer device 232 completes outputting through printing, the job control unit 105 transmits a job completion notification regarding the print job to the management unit 104.

<Step S95>

In response to reception of the job completion notification regarding the print job, the management unit 104 updates the presence or absence of a job of the row whose function category is printer in the display setting table 1100 to "ABSENT" for management. In this way, it is registered that processing of a job for any of applications belonging to the function category of printer is completed and there is no job yet to be processed. Consequently, the app icons of the applications belonging to the function category of printer are no longer displayed.

<Steps S96 and S97>

If the display setting of the record whose function category is printer is "NOT DISPLAY" and the presence or absence of a job is "ABSENT" in the display setting table 1100, the following processing is performed. The management unit 104 transmits information associating applications ("PRINTER APP Dl" and "PRINTER/SCANNER APP F1" in this case) indicated by records whose function category is printer in the application function category table 1200 with the display setting indicating "NOT DISPLAY" to the display control unit 107. The display control unit 107 causes app icons of the applications "PRINTER APP Dl" and "PRINTER/SCANNER APP F1" not to be displayed in the home screen 1400 in accordance with the received association information.

Through steps S81 to S97 described above, the app icon display/non-display operation is performed when a print job is enqueued.

As described above, the MFP 10 according to the embodiment assigns a function category to each application and stores the function category assigned to each application to enable a setting for displaying or not displaying app icons to be made for each function category. When displaying a screen (for example, the home screen 1400) including app icons, the MFP 10 refers to the display settings for the respective function categories to cause app icons of the respective applications to be displayed or not to be displayed. This eliminates the necessity of making a setting for displaying or not displaying an app icon for each application and enables the setting for displaying or not displaying the app icons to be made for each function category. Consequently, the setting of displaying or not displaying app icons of applications can be made easily on the basis of each function.

In addition, the MFP 10 according to the embodiment assigns a function category to each job. When a job is enqueued, the MFP 10 displays app icons of applications belonging to a function category corresponding to the job. That is, even if a display setting of a particular function category is "NOT DISPLAY", the MFP 10 displays app icons of applications belonging to the particular function category when a job belonging to the particular function category is enqueued. This enables a situation to be avoided in which an app icon of an application for operating a job enqueued from an external apparatus is not displayed and thus no operation can be performed for the job, improving convenience for the user.

Further, in the case where a plurality of function categories are assigned to a particular application in the application function category table 1200, the MFP 10 according to the embodiment does not display the app icon of the particular application if all the display settings of the plurality of function categories are "NOT DISPLAY" in the display setting table 1100. In the case where app icons are not displayed because the app icons of applications having a function that is not to be used are obtrusive, even if "NOT DISPLAY" is set for at least one of the plurality of functions of the application, the app icon of the application is displayed. Therefore, the user can use the application. When a plurality of function categories are assigned to a particular application, it is determined whether or not all the display settings of the plurality of function categories are "NOT DISPLAY" in step S15 in FIG. 11 and step S45 in FIG. 13 described above; however, the configuration is not limited to this one. Specifically, it may be determined whether or not any of the display settings of the plurality of function categories is "NOT DISPLAY". If any of the display settings of the plurality of function categories is "NOT DISPLAY", the app icon of the particular application may be not displayed. For example, in the case where the use of a particular function needs to be prohibited (for example, in the case where an engine implementing the particular function is out of order), all app icons of applications having the function for which "NOT DISPLAY" is set are not displayed. Therefore, the use of the particular function can be prevented.

To allow a user to use applications associated with at least one of the functions alone in such an MFP, there is a method for causing icons of applications associated with the other functions not to be displayed. However, if there are a plurality of applications associated with the other functions, it takes time to configure a setting for not displaying an icon for each of the applications.

According to one aspect of the present disclosure, a setting for displaying or not displaying icons of applications associated with each function can be configured easily.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), a system on a chip (SoC), a graphics processing unit (GPU), and conventional circuit components arranged to perform the recited functions.

When at least one of the functional units of the MFP 10 is implemented as a result of execution of a program in the embodiment described above, the program is stored in advance on the ROM or the like and is provided. In addition, in the embodiment described above, the program executed by the MFP 10 may be stored as a file in an installable format or an executable format on a computer-readable recording medium such as a CD-ROM, a flexible disk (FD), a CD-R, and a DVD and be provided. Further, in the embodiment described above, the program executed by the MFP 10 may be stored on a computer connected to a network such as the Internet and may be downloaded via the network to be provided to the MFP 10. Furthermore, in the embodiment described above, the program executed by the MFP 10 may be provided or distributed via a network such as the Internet. Moreover, in the embodiment described above, the program executed by the MFP 10 has a module configuration including at least one of the functional units described above. A CPU that is actual hardware reads the program from the storage device described above and executes the program to load and generate each of the functional units described above in the main storage device.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

What is claimed is:

1. An image forming apparatus on which a plurality of applications each for executing at least one of a plurality of functions of the image forming apparatus are installed, the image forming apparatus comprising:
 a memory to store first information associating each of the plurality of functions with the plurality of applications such that each of the plurality of functions are simultaneously associable with multiple ones of the plurality of applications; and
 processing circuitry configured to:
  set, for each of the plurality of functions, restriction information indicating whether or not to restrict use of a corresponding one of the plurality of functions; and
  control, in a screen including icons each for starting a corresponding one of the plurality of applications, a display state of each of the icons of the applications based on the restriction information and the first information such that display of the icons associated with each of the plurality of applications associated with the corresponding one of the plurality of functions are simultaneously controlled based on the restriction information set for the corresponding one of the plurality of functions so that availability of the icons for starting each of the corresponding one of the plurality of applications as a whole vary based on the restriction information of the plurality of functions associated therewith and the first information.

2. The image forming apparatus of claim 1, wherein
 in a case where the restriction information set for the corresponding one of the plurality of functions indicates that the use of the corresponding one of the plurality of functions is to be restricted, the processing circuitry is further configured to set the icon of the application in a display state indicating that the corresponding one of the plurality of functions is not available, and
 in a case where the restriction information indicates that the use of the corresponding one of the plurality of functions is not to be restricted, the processing circuitry is further configured to set the icon in a display state indicating that the corresponding one of the plurality of functions is available.

3. The image forming apparatus of claim 2, wherein
 in the case where the restriction information set for the corresponding one of the plurality of functions associated with the application by the first information indicates that the use of the corresponding one of the plurality of functions is to be restricted, the processing circuitry is further configured to cause the icon of the application not to be displayed, and
 in the case where the restriction information indicates that the use of the corresponding one of the plurality of functions is not to be restricted, the processing circuitry is further configured to cause the icon to be displayed.

4. The image forming apparatus of claim 1, wherein
 the memory further stores second information associating a job with a function used for processing the job among the plurality of functions,
 the processing circuitry is further configured to:
  associate, in response to enqueuing of a job, information indicating enqueuing of the job with the corresponding one of the plurality of functions associated with the job by the second information to manage the information and the job; and
  set the icon of the application associated with the corresponding one of the plurality of functions by the first information in a display state indicating that the corresponding one of the plurality of functions is available irrespective of content of the restriction information set for the corresponding one of the plurality of functions associated with the information indicating enqueuing of the job.

5. The image forming apparatus of claim 4, wherein
 in response to completion of processing of the job, the processing circuitry is further configured to delete, from the function associated with the information indicating enqueuing of the job, association of the information indicating enqueuing of the job, and in a case where the restriction information set for the function associated with the application by the first information indicates that the use of the function is to be restricted and in a case where no information indicating enqueuing of a job is associated with the function, the processing circuitry is further configured to set the icon of the application in the display state indicating that the function is not available.

6. The image forming apparatus of claim 1, wherein in a case where two or more functions among the plurality of functions are associated with the application by the first information and the restriction information set for each of the two or more functions indicates that the use of the function is to be restricted, the processing circuitry is further configured to set the icon of the application in a display state indicating that the function is not available.

7. The image forming apparatus of claim 1, wherein in a case where two or more functions among the plurality of functions are associated with the application by the first information and the restriction information set for at least one of the two or more functions indicates that the use of the function is to be restricted, the processing circuitry is further configured to set the icon of the application in a display state indicating that the function is not available.

8. The image forming apparatus of claim 1, wherein the processing circuitry is configured to, receive, a job from an external apparatus, the job being associated with performing the corresponding one of the plurality of functions, determine which of the plurality of applications are associated with the job, and control, while executing the job, the display state for each of the icons of the applications associated with the job, to available such that the display state for each of the icons of the applications associated with the job are set to available irrespective of the restriction information.

9. The image forming apparatus of claim 8, wherein the processing circuitry is configured to, reset, upon completion of the job, the display state for each of the icons of the applications associated with the job such that the display state is controlled based on the restriction information and the first information.

10. An information processing method performed by an image forming apparatus on which a plurality of applications each for executing at least one of a plurality of functions of the image forming apparatus are installed, the information processing method comprising:

reading, from a memory, first information associating each of the plurality of functions with the plurality of applications such that each of the plurality of functions are simultaneously associable with multiple ones of the plurality of applications;

setting, for each of the plurality of functions, restriction information indicating whether or not to restrict use of a corresponding one of the plurality of functions; and controlling, in a screen including icons each for starting a corresponding one of the plurality of applications, a display state of each of the icons of the applications based on the restriction information and the first information such that display of the icons associated with each of the plurality of applications associated with the corresponding one of the plurality of functions are simultaneously controlled based on the restriction information set for the corresponding one of the plurality of functions so that availability of the icons for starting each of the corresponding one of the plurality of applications as a whole vary based on the restriction information of the plurality of functions associated therewith and the first information.

11. The information processing method of claim 10, further comprising:

receiving, a job from an external apparatus, the job being associated with performing the corresponding one of the plurality of functions; and determining which of the plurality of applications are associated with the job, wherein the controlling controls, while executing the job, the display state for each of the icons of the applications associated with the job, to available such that the display state for each of the icons of the applications associated with the job are set to available irrespective of the restriction information.

12. The information processing method of claim 11, further comprising:

resetting, upon completion of the job, the display state for each of the icons of the applications associated with the job such that the display state is controlled based on the restriction information and the first information.

13. A non-transitory computer-readable medium storing a program for causing an image forming apparatus to perform a method, the image forming apparatus having a plurality of applications installed each for executing at least one of a plurality of functions of the image forming apparatus, the method comprising:

reading, from a memory, first information associating each of the plurality of functions with the plurality of applications such that each of the plurality of functions are simultaneously associable with multiple ones of the plurality of applications;

setting, for each of the plurality of functions, restriction information indicating whether or not to restrict use of a corresponding one of the plurality of functions; and controlling, in a screen including icons each for starting a corresponding one of the plurality of applications, a display state of each of the icons of the applications based on the restriction information and first information such that display of the icons associated with each of the plurality of applications associated with the corresponding one of the plurality of functions are simultaneously controlled based on the restriction information set for the corresponding one of the plurality of functions so that availability of the icons for starting each of the corresponding one of the plurality of applications as a whole vary based on the restriction information of the plurality of functions associated therewith and the first information.

\* \* \* \* \*